(12) United States Patent
Chen

(10) Patent No.: US 8,072,959 B2
(45) Date of Patent: Dec. 6, 2011

(54) GENERATING METHOD FOR SHORT TRAINING FIELD IN IEEE 802.11N COMMUNICATION SYSTEMS

(75) Inventor: Jeng-Hong Chen, Temple City, CA (US)

(73) Assignee: ISSC Technologies Corp., Hsinchu (TW)

( * ) Notice: Subject to any disclaimer, the term of this patent is extended or adjusted under 35 U.S.C. 154(b) by 891 days.

(21) Appl. No.: 12/043,722

(22) Filed: Mar. 6, 2008

(65) Prior Publication Data
US 2009/0225727 A1    Sep. 10, 2009

(51) Int. Cl.
*H04J 1/00* (2006.01)
(52) U.S. Cl. .......................... 370/343; 370/337
(58) Field of Classification Search .................. 370/337, 370/343, 349, 504; 455/101
See application file for complete search history.

(56) References Cited

U.S. PATENT DOCUMENTS

| | | | |
|---|---|---|---|
| 2004/0170197 A1* | 9/2004 | Mehta | 370/504 |
| 2005/0113026 A1 | 5/2005 | Moorti et al. | |
| 2005/0164655 A1* | 7/2005 | Nakao et al. | 455/101 |
| 2005/0180360 A1 | 8/2005 | Hansen et al. | |
| 2005/0180368 A1 | 8/2005 | Hansen et al. | |
| 2005/0233709 A1 | 10/2005 | Gardner et al. | |
| 2005/0281241 A1* | 12/2005 | Webster et al. | 370/343 |
| 2005/0286474 A1 | 12/2005 | Van Zelst et al. | |
| 2006/0088120 A1 | 4/2006 | Hansen et al. | |
| 2006/0193340 A1 | 8/2006 | Jones et al. | |
| 2006/0274847 A1 | 12/2006 | Molisch et al. | |
| 2006/0274852 A1 | 12/2006 | Trachewsky et al. | |
| 2007/0097946 A1* | 5/2007 | Mujtaba | 370/349 |

OTHER PUBLICATIONS

Stuart J. Kerry et al., IEEE P802/11 n/D2.00, Feb. 2007: Draft Standard for Information Technology—telecommunications and information exchange between systems—Local and metropolitan area networks—Specific requirements—Part 11. pp. i, 6, 253 and 254.*
IEEE P802.11n/D2.00, Feb. 2007.

* cited by examiner

*Primary Examiner* — Andrew Lai

(57) ABSTRACT

The present invention discloses a generating method for short training field in IEEE 802.11n communication systems, mainly comprising the steps of: storing only a first set of time-domain HT-STF sequences in the memory; and deriving a second set of the time-domain HT-STF sequences from the first set of the time-domain HT-STF sequences. The first set of time-domain HT-STF sequences is the time-domain HT-STF sequences either for lower 20 MHz of 40 MHz BW or upper 20 MHz of 40 MHz BW. According to the invention, it is shown that only one set of time-domain HT-STF sequence needs to be stored in the memory. The other three sets of time-domain HT-STF sequence can be generated easily from simple calculation. Therefore, the saving in buffer size to implement all four configurations is significant.

16 Claims, 1 Drawing Sheet

HT-STF IN FOUR BW CONFIGURATIONS

FIG. 1 PACKET FORMAT
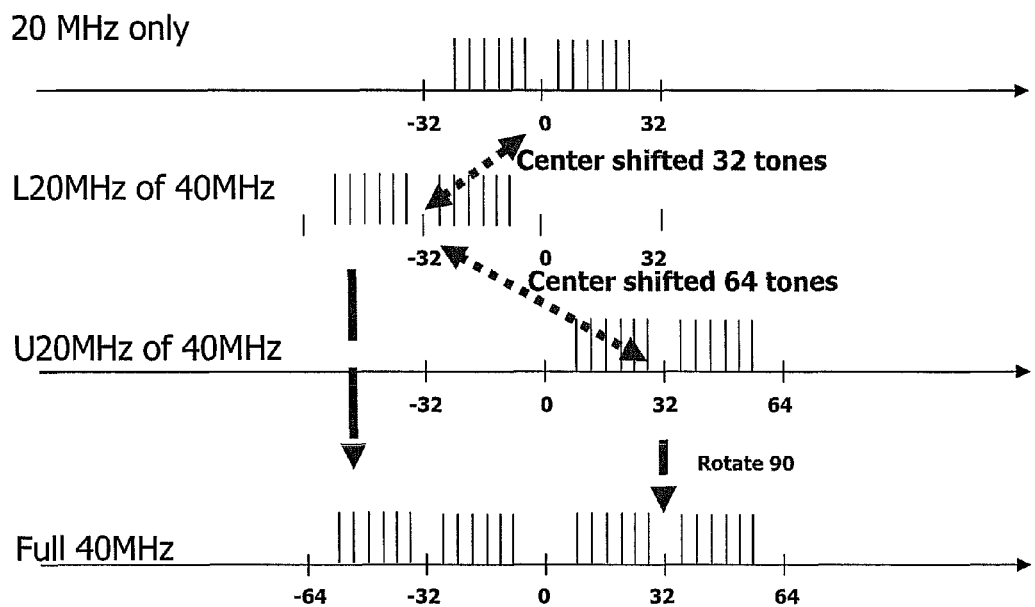
FIG. 2 HT-STF IN FOUR BW CONFIGURATIONS

GENERATING METHOD FOR SHORT TRAINING FIELD IN IEEE 802.11N COMMUNICATION SYSTEMS

BACKGROUND OF THE INVENTION

1. Field of the Invention

The present invention generally relates to a packet-based generating method, and more particularly to a generating method for Short Training Field (STF) useful to IEEE 802.11n Wireless Local Area Network (WLAN) communication system.

2. Background Art

In a wireless communication system, the packet format normally includes a fixed-pattern preamble. The preamble serves several purposes, namely, to identify the packet type, and to provide signal for Direct Current (DC) offset estimation, frequency offset estimation and channel estimation. In most wireless communication systems, an important field of the preamble is High-Throughput Short Training Field (HT-STF).

The IEEE 802.11n draft specification [1] specifies four bandwidth (BW) configurations. The first one is a simple 20 MHz BW. The second configuration is 40 MHz BW. The third configuration is that a transmitter nominally operating in the 40 MHz BW mode may use the lower 20 MHz BW only to transmit. The fourth configuration is that a transmitter nominally operating in the 40 MHz BW mode may use the upper 20 MHz only to transmit. The HT-STF in each of these four configurations is mathematically derived from a different frequency-domain sequence, but the transmitter needs to transmit the corresponding time-domain sequence. A transmitter could store these frequency-domain sequences in the Read-Only Memory (ROM) and performs a Fast Fourier Transform (FFT) operation before transmitting the time-domain sequence. But a more efficient way is to store the time-domain sequence in the ROM. In this case, it is required to store all four sets of time-domain HT-STF sequences. Since there are 64 or 128 complex samples (real and imaginary parts) in HT-STF for each mode and a number of bits are required for each real or imaginary sample, the total buffer size becomes significant. If over-sampling is implemented at transmitter, the required buffer size will be further multiplied.

Several U.S. Patent Applications including: U.S. Patent Application 20060274852, entitled as "Modified preamble for programmable transmitter", Dec. 7, 2006; U.S. Patent Application 20060274847, entitled as "Training frames for MIMO stations", Dec. 7, 2006; U.S. Patent Application 20060193340, entitled as "Wireless messaging preambles allowing for beamforming and legacy device coexistence", Aug. 31, 2006; U.S. Patent Application 20060088120, entitled as "Mixed mode preamble for MIMO wireless communications", Apr. 27, 2006; U.S. Patent Application 20050286474, entitled as "Modified preamble structure for IEEE 802.11a extensions to allow for coexistence and interoperability between 802.11a devices and higher data rate, MIMO or otherwise extended devices", Dec. 29, 2005; U.S. Patent Application 20050233709, entitled as "Modified preamble structure for IEEE 802.11a extensions to allow for coexistence and interoperability between 802.11a devices and higher data rate, MIMO or otherwise extended devices", Oct. 20, 2005; U.S. Patent Application 20050180360, entitled as "Preamble formats for MIMO wireless communications", Aug. 18, 2005; U.S. Patent Application 20050113026, entitled as "Frame format for high data throughput wireless local area network transmissions", May 26, 2005; and U.S. Patent Application 20050180368, "Multiple protocol wireless communications in a WLAN", Aug. 18, 2005; are prior arts claiming the format of HT-STF, and their intents are to become the essential patent for implementing IEEE 802.11n draft specification. However, none of these prior arts mentioned any methods of efficient generating method with reduced ROM requirement and simple arithmetic operations to generate all the time-domain HT-STF sequences for all four BW configurations.

BRIEF SUMMARY OF THE INVENTION

It is an objective of the present invention to provide an efficient generating method with reduced ROM requirement and simple arithmetic operations to generate all the time-domain HT-STF sequences for all four BW configurations.

To achieve the above and other objectives, the present invention provides a generating method for short training field in IEEE 802.11n communication systems, mainly comprising the steps of: storing only the first set of time-domain HT-STF sequences in the memory; and deriving a second set of the time-domain HT-STF sequences from the first set of the time-domain HT-STF sequences.

According to one aspect of the generating method of the present invention, the first set of time-domain HT-STF sequences is the time-domain HT-STF sequences either for lower 20 MHz of 40 MHz BW or upper 20 MHz of 40 MHz BW configuration.

In this invention, it is shown that only one set of time-domain HT-STF sequence is required to be stored. The other three sets of time-domain HT-STF sequence can be generated easily from simple calculation. Therefore, the saving in buffer size to implement all four configurations is significant.

BRIEF DESCRIPTION OF THE SEVERAL VIEWS OF THE DRAWINGS

The invention itself, though conceptually explained in above, can be best understood by referencing to the following description, taken in conjunction with the accompanying drawings.

FIG. 1. shows the IEEE 802.11n packet format.

FIG. 2. shows HT-STF in 4 BW configurations.

DETAILED DESCRIPTION OF THE INVENTION

Although the invention is explained in relation to several preferred embodiments, the accompanying drawings and the following detailed descriptions are the preferred embodiment of the present invention. It is to be understood that the following disclosed descriptions will be examples of present invention, and will not limit the present invention into the drawings and the special embodiment.

In general, a generating method for short training field in IEEE 802.11n communication systems according to the present invention is disclosed. It mainly comprising the steps of (a) storing only a first set of time-domain High-Throughput Short Training Field (HT-STF) sequences in the memory; and (b) deriving a second set of the time-domain HT-STF sequences from the first set of the time-domain HT-STF sequences. In the first embodiment of the present invention, the first set of time-domain HT-STF sequences is the time-domain HT-STF sequences ($y_n$) for lower 20 MHz of 40 MHz bandwidth (BW). In the second embodiment of the present invention, the first set of time-domain HT-STF sequences is the time-domain HT-STF sequences ($z_n$) for upper 20 MHz of 40 MHz bandwidth (BW) configuration.

Please referring to FIG. 1, it is the general packet format for the IEEE P802.11D2.00, February 2007 [1]. Similar to but not the same as IEEE P802.11n/D2.00, February 2007, in this invention., the frequency-domain HT-STF sequences ($X_k$) in 20 MHz BW are set and specified as follows:

$$X_{-32,31} = \sqrt{1/2}\{0,0,0,0,0,0,0,0,1+j,0,0,0,-1-j,0,0,0,1+j,0,0,0,$$
$$-1-j,0,0,0,-1-j,0,0,0,1+j,0,0,0,\ 0,0,0,0,-1-j,0,0,$$
$$0,-1-j,0,0,0,1+j,0,0,0,1+j,0,0,0,1+j,0,0,0,1+j,0,0,$$
$$0,0,0,0,0\} \quad \text{(Eq-1)}$$

And the corresponding time-domain sequences can be obtained after a 64-point inverse FFT operation resulting 64-point, 50 nanosecond (ns) spacing samples ($x_n$):

$$x_n = \frac{1}{64}\sum_{k=-32}^{31} X_k W_{64}^{-nk}; \quad \text{(Eq-2)}$$

where $$W_{64} = e^{-j2\pi/64}; n = 0, 1, 2, \ldots 63$$

The total length of 64 samples is 3.2 microseconds (μs).

Because the frequency-domain HT-STF sequences have non-zero values appear only at every 4 points, the property of FFT indicates that the period is 64 samples divided by 4 in time-domain. Therefore, only 0.8 μs (i.e., sixteen 50 ns samples) of HT-STF time-domain signal is required to be stored in ROM. Namely, $$x_n = \frac{1}{64}\sum_{k=-32}^{31} X_k W_{64}^{-nk}; \quad \text{(Eq-3)}$$

where $$W_{64} = e^{-j2\pi/64}; n = 0, 1, 2, \ldots 15$$

The actual HT-STF is 5 periods of the 0.8 μs time-domain sequences, resulting in a total length of 4 μs.

Note that a generalized embodiment may store HT-STF at different sampling rates. For example, an embodiment may store 40 MHz (25ns samples), HT-STF time-domain sequences for 20 MHz BW configuration and store 80 MHz (12.5ns samples), HT-STF for the other three 40 MHz configurations, i.e., upper 20 MHz, or lower 20 MHz of 40 MHz and 40 MHz BW configurations. Without losing generality, the equations in the following sections are first presented using minimum number of inverse FFT or FFT samples as defined in this invention to specify the sequences in the time or frequency-domain, i.e., HT-STF time-domain sequences for 20 MHz BW configuration at 20 MHz (or 50 ns) samples and those for upper 20 MHz, lower 20 MHz and 40 MHz BW configurations at 40 MHz (or 25 ns) samples.

For simplicity of explanation, we first examine the third BW configuration, i.e. the transmitter nominally operating in the 40 MHz BW configuration is transmitting only in the lower 20 MHz BW. The frequency-domain HT-STF sequences ($Y_k$) for this configuration are specified, in this invention, as follows:

$$Y_{-64,63} = \sqrt{1/2}\{0,0,0,0,0,0,0,0,1+j,0,0,0,-1-j,0,0,0,1+j,0,0,0,$$
$$-1-j,0,0,0,-1-j,0,0,0,1+j,0,0,0,\ 0,0,0,0,-1-j,0,0,$$
$$0,-1-j,0,0,0,1+j,0,0,0,1+j,0,0,0,1+j,0,0,$$
$$0,0,0,0,0,0,\ 0,0,0,0,0,0,0,0,0,0,0,0,0,0,0,0,0,0,0,0,0,$$
$$0,0,0,0,0,0,0,0,0,0,\ 0,0,0,0,0,0,0,0,0,0,0,0,0,0,0,0,$$
$$0,0,0,0,0,0,0,0,0,0,0,0,0,0\} \quad \text{(Eq-4)}$$

Please referring to FIG. 2, it illustrates that the frequency-domain sequences ($Y_k$) for lower 20 MHz in 40 MHz BW are merely 32-tone shift of those for 20 MHz BW configuration ($X_k$). This relationship is easily shown by comparing (Eq-1) and (Eq-4). The corresponding time-domain HT-STF sequences are generated from a 128-point inverse FFT operation to obtain 128-point, 25 ns time-domain samples resulting in a total length of 3.2 μs. In short, $$y_n = \frac{1}{128}\sum_{k=-64}^{63} Y_k W_{128}^{-nk}; \quad \text{(Eq-5)}$$

where $$W_{128} = e^{-j2\pi/128}; n = 0, 1, 2, \ldots 127$$

Because the frequency-domain HT-STF sequences have non-zero values appear only at every 4 points, the property of FFT indicates that the period is 128 samples divided by 4. Therefore, only 0.8 μs (i.e, or thirty-two 12.5 ns samples) time-domain HT-STF signal is required to be stored in ROM. Namely, $$y_n = \frac{1}{128}\sum_{k=-64}^{63} Y_k W_{128}^{-nk}; \quad \text{(Eq-6)}$$

where $$W_{128} = e^{-j2\pi/128}; n = 0, 1, 2, \ldots 31$$

By inserting (Eq-1) into (Eq-6), $$y_{2n} = \frac{1}{128}\sum_{k=-64}^{63} Y_k W_{128}^{-2nk} \quad \text{(Eq-7)}$$
$$= \frac{1}{128}\sum_{k=-64}^{-1} Y_k W_{128}^{-2nk}$$
$$= \frac{1}{128}\sum_{k'=-32}^{31} X_{k'} W_{128}^{-2n(-32+k')}$$
$$= \frac{1}{2} W_{128}^{-2n(-32)} \frac{1}{64}\sum_{k'=-32}^{31} X_{k'} W_{128}^{-2n(k')}$$
$$= \frac{1}{2} W_{128}^{64n} \frac{1}{64}\sum_{k'=-32}^{31} X_{k'} W_{64}^{-nk'}$$
$$= \frac{(-1)^n}{2} x_n$$

Therefore, $$x_n = 2(-1)^n y_{2n}; n = 0, 1, 2, 3, \ldots, 15 \quad \text{(Eq-8)}$$

According to (Eq-8), only a simple operation is required to generate time-domain HT-STF sequences, $x_n$, from $y_n$. In later section, it will be shown that only one set of sequences, $y_n$, is required to generate the other three sets of HT-STF.

Similarly, the frequency-domain HT-STF sequences ($Z_k$) in upper 20 MHz of the 40 MHz BW configuration are specified in this invention as follows:

$$Z_{-64,63} = \sqrt{1/2}\{0,0,0,0,0,0,0,0,0,0,0,0,0,0,0,0,0,0,0,0,0,0,0,0,0,0,0,0,0,0,0,0,$$
$$0,0,0,0,0,0,0,0,0,0,0,0,0,0,0,0,0,0,0,0,0,0,0,0,0,0,0,0,0,0,$$
$$0,0,0,0,0,0,0,0,0,\ 0,0,0,0,0,0,0,0,0,1+j,0,0,0,-1-j,0,$$
$$0,0,1+j,0,0,0,-1-j\ ,0,0,0,-1-j,0,0,0,1+j,0,0,0,$$
$$0,0,0,0,-1-j,0,0,0,-1-j,0,0,0,1+j,0,0,0,1+j,0,0,0,$$
$$1+j,0,0,0,1+j,0,0,0,0,0,0,0\} \quad \text{(Eq-9)}$$

FIG. 2 illustrates that the frequency-domain HT-STF sequences for upper 20 MHz of 40 MHz BW configuration are merely a 64-tone shift of those for lower 20 MHz of 40 MHz BW configuration. This relationship is easily shown by comparing (Eq-4) and (Eq-9).

And the time-domain HT-STF sequences ($z_n$) for upper 20 MHz in 40 MHz BW configuration are $$z_n = \frac{1}{128} \sum_{k=-64}^{63} Z_k W_{128}^{-nk} \quad \text{(Eq-10)}$$

$$= \frac{1}{128} \sum_{k=0}^{63} Z_k W_{128}^{-nk}$$

$$= \frac{1}{128} \sum_{k'=64}^{-1} Y_{k'} W_{128}^{-n(64+k')}$$

$$= W_{128}^{-n(64)} \frac{1}{128} \sum_{k'=-64}^{63} Y_{k'} W_{128}^{-n(k')}$$

$$= (-1)^n y_n; n = 0, 1, 2, 3, \ldots, 31$$

Therefore, (Eq-11)
$$z_n = (-1)^n y_n; n = 0, 1, 2, 3, \ldots, 31.$$

According to (Eq-11), only a simple operation is required to generate time-domain HT-STF sequences, $z_n$, from $y_n$. Similarly, only 800 ns time-domain sequences (or thirty-two 40 MHz samples) in this configuration are required to be stored.

This invention specifies the frequency-domain HT-STF sequences ($G_k$) in 40 MHz BW as follows:

$G_{-58,58}=$
$\sqrt{1/2}\{0,0,0,0,1+j,0,0,0,-1-j,0,0,0,1+j,0,0,0,-1-j,0,0,$
$0,-1-j,0,0,0,1+j,0,0,0,0,0,0,0,-1-j,0,0,0,-1-j,0,$
$0,0,1+j,0,0,0,1+j,0,0,0,1+j,0,0,0,1+j,0,0,0,0,0$
$0,0,0,0,0,0,0,0,0,1+j,0,0,0,-1-j,0,0,0,1+j,0,0,$
$0,-1-j,0,0,0,-1-j,0,0,0,1+j, 0,0,0,0,0,0,0,-1-j,0,$
$0,0,-1-j,0,0,0,1+j,0,0,0,1+j,0,0,0,1+j,0,0,0,1+j,0,$
$0\}$ (Eq-12)

This is a superposition of lower and upper 20 MHz of 40 MHz BW configurations as illustrate in FIG. 2. This relationship is easily shown by comparing (Eq-4), (Eq-9), and (Eq-12). In order to randomize the frequency signals of the lower and upper 20 MHz HTSIG, a 90 degrees rotation of the upper 20 MHz HT-SIG signal only is specified in [1]. This results a multiplication of j on the upper 20 MHz only for the time or frequency-domain sequences. The overall time-domain sequences actually transmitted are equivalent to the following:

$$g_n = y_n + jz_n = [1+j(-1)^n]y_n; n=0,1,2,\ldots,31 \quad \text{(Eq-13)}$$

According to (Eq-13), only a simple operation is required to generate the time-domain HT-STF sequences, $g_n$, from $y_n$. Note that these time-domain HT-STF sequences are required to be normalized to maintain a constant total power throughout the duration of the packet. This constant normalization factor may be easily implemented by a set of simple shift-and-add hardware before transmitted the time-domain sequences, $Z_k$.

In the above derivation, only one set of time-domain HT-STF sequences, $y_n$, is required to be stored and the other three sets of time-domain HT-STF sequences can be easily derived from $y_n$. Since the sequences $y_n$ and $z_n$ are exchangeable from (Eq-11), another embodiment is to store the sequence, $z_n$, and derive the other three sequences from $z_n$ as follows:

$$y_n = (-1)^n z_n; n=0,1,2,3,\ldots,31$$

$$x_n = 2(-1)^n y_{2n} = 2(-1)^n(-1)^{2n} z_{2n} = 2(-1)^n z_{2n}; n=0,1,2,3,\ldots,15$$

$$g_n = [1+j(-1)^n]y_n = [1+j(-1)^n](-1)^n z_n = [(-1)^n+j]z_n; n=0,1,2,\ldots,31 \quad \text{(Eq-14)}$$

In short, only one set of sequence, (either $y_n$ or $z_n$) of the four time domain HT-STF sequences is required to be stored.

In the practical implementation, 40 MHz time-domain samples (or two-time up-sampling) are required to represent a signal with 20 MHz BW. In short, 40 MHz time-domain samples for the first 20 MHz BW configuration and 80 MHz time-domain samples for the other three 40 MHz BW configurations are required. The 40 MHz HT-STF time-domain samples for the first 20 MHz BW configuration can be specified as follows:

$$x_n = \frac{1}{128} \sum_{k=-64}^{63} X_k W_{128}^{-nk}; \quad \text{(Eq-15)}$$

where $$W_{128} = e^{-j2\pi/128}; n=0,1,2,\ldots,31$$

Note that only 800 ns time-domain samples (or thirty-two 40 MHz samples) are required to be stored. This inverse FFT operation covers a 40 MHz BW from −20 MHz to +20 MHz in the frequency-domain. However, the non-zero frequency-domain sequences, $X_k$, only exist in the inner 20 MHz BW, i.e., −10 MHz to +10 MHz. Similarly, the 80 MHz HT-STF time-domain samples for the lower 20 MHz of 40 MHz configuration are obtained as follows:

$$y_n = \frac{1}{256} \sum_{k=-128}^{127} Y_k W_{256}^{-nk}; \quad \text{(Eq-16)}$$

where $$W_{256} = e^{-j2\pi/256}; n=0,1,2,\ldots,63$$

Note that only 800 ns time-domain samples (or sixty-four 80 MHz samples) are required to be stored. This inverse FFT operation covers an 80 MHz BW from −40 MHz to +40 MHz in the frequency-domain. However, the non-zero frequency-domain sequences, $Y_k$, only exist in the frequency-domain from −20 MHz to 0 MHz. Follow the similar derivations as shown in (Eq-7), the relationship between $x_n$ and $y_n$ can be established as follows:

$$y_{2n} = \frac{1}{256} \sum_{k=-128}^{127} Y_k W_{256}^{-2nk} \quad \text{(Eq-17)}$$

$$= \frac{1}{256} \sum_{k=-64}^{-1} Y_k W_{256}^{-2nk}$$

$$= \frac{1}{256} \sum_{k'=-32}^{31} X_{k'} W_{256}^{-2n(-32+k')}$$

-continued $$= \frac{1}{2} W_{256}^{-2n(-32)} \frac{1}{128} \sum_{k'=-32}^{31} X_{k'} W_{256}^{-2n(k)}$$

$$= \frac{1}{2} W_{256}^{64n} \frac{1}{128} \sum_{k'=-32}^{31} X_{k'} W_{128}^{-nk'}$$

$$= \frac{(-j)^n}{2} x_n$$

Note that, $X_k=0$, for k<−32 and k>=32 and $Y_k=0$, for k<−64 and k>0. Therefore, $$x_n=2(j)^n y_{2n}; n=0, 1, 2, 3, \ldots, 31 \quad \text{(Eq-18)}$$

Another 80 MHz HT-STF time-domain sequences for the upper 20 MHz of 40 MHz configuration can be similarly derived as follows:

$$z_n = \frac{1}{256} \sum_{k=-128}^{127} Z_k W_{256}^{-nk} \quad \text{(Eq-19)}$$

$$= \frac{1}{256} \sum_{k=0}^{63} Z_k W_{256}^{-nk}$$

$$= \frac{1}{256} \sum_{k'=-64}^{-1} Y_{k'} W_{256}^{-n(64+k')}$$

$$= W_{256}^{-n(64)} \frac{1}{256} \sum_{k'=-64}^{-1} y_{k'} W_{256}^{-n(k')}$$

$$= W_{256}^{-n(64)} \frac{1}{256} \sum_{k'=-128}^{127} Y_{k'} W_{256}^{-n(k')}$$

$$= (j)^n y_n; n = 0, 1, 2, \ldots 63$$

Note that, $Z_k=0$, for k<0 and k≥64. The non-zero frequency-domain sequences, $Z_k$, only exist from 0 MHz to 20 MHz.

The last 80 MHz time-domain samples is the supposition of $y_n$ and rotation 90 degree of $z_n$ as discussed, i.e., $$g_n=y_n+jz_n=[1+j(j)^n]y_n=[1+(j)^{n+1}]y_n; n=0, 1, 2, \ldots, 63 \quad \text{(Eq-20)}$$

According to (Eq-19), one can store the sequences, $z_n$, and derive all other sequences as follows:

$$y_n=(-j)^n z_n; n=0, 1, 2, 3, \ldots, 63$$

$$x_n=2(j)^n y_{2n}=2(j)^n(-j)^{2n} z_{2n}=2(-j)^n z_{2n}; n=0,1,2,3, \ldots, 31$$

$$g_n=[1+j(j)^n]y_n=[1+(j)^{n+1}](-j)^n z_n=[(-j)^n+j]z_n; n=0, 1, 2, \ldots, 63 \quad \text{(Eq-21)}$$

Therefore, if two-time up-sampling is implemented for the HT-STF, only one set of 800 ns time-domain sequences, either $y_n$ or $z_n$, is required to be stored. The HT-STF of the other three BW configurations can be obtained from simple calculation as shown from (Eq-18) to (Eq-21).

The above derivations allow one to implement all four sets of time-domain HT-STF from one set of 40 MHz or 80 MHz time-domain sequences. For one skill in the arts, it is easily to implement all four BW configurations from one set of 160 MHz, 320 MHz or higher, time-domain samples from similar derivations discussed in the above embodiments.

According to the preferred embodiment of the present invention, it is shown that only one set of time-domain HT-STF sequence is required to be stored in the Read-Only Memory (ROM). The stored set of time-domain HT-STF sequences is the time-domain HT-STF sequences either for lower 20 MHz of 40 MHz configuration or upper 20 MHz of 40 MHz configuration. The other three sets of time-domain HT-STF sequence can be generated easily from simple calculation. Therefore, the saving in buffer size to implement all four configurations is significant.

Accordingly, the scope of this invention includes, but is not limited to, the actual implementation of the present invention. Although the invention has been explained in relation to its preferred embodiment, it is not used to limit the invention. It is to be understood that many other possible modifications and variations can be made by those skilled in the art without departing from the spirit and scope of the invention as hereinafter claimed.

What is claimed is:

1. A generating method for short training field in IEEE 802.11n communication systems, comprising the steps of:
    storing only a first set of time-domain High-Throughput Short Training Field (HT-STF) sequences in a memory; and
    deriving a second set of the time-domain HT-STF sequences from the first set of the time-domain HT-STF sequences;
    wherein the first set of time-domain HT-STF sequences is a time-domain HT-STF sequences ($y_n$) for lower 20 MHz of 40 MHz bandwidth (BW) configuration, based on the relation as $$y_n = \frac{1}{128} \sum_{k=-64}^{63} Y_k W_{128}^{-nk};$$

where $$W_{128} = e^{-j2\pi/128}; n = 0, 1, 2, \ldots 31;$$

wherein j is $\sqrt{-1}$ and $Y_k$ is a first set of frequency-domain HT-STF sequences ($Y_k$) for lower 20 MHz of 40 MHz BW configuration defined as:

$Y_{-64,63}=$
$\sqrt{1/2}\{0,0,0,0,0,0,0,0,1+j,0,0,0,-1-j,0,0,0,1+j,0,0,0,$
$-1-j,0,0,0,-1-j,0,0,0,1+j,0,0,0, 0,0,0,0,-1-j,0,0,$
$0,-1-j,0,0,0,1+j,0,0,0,1+j,0,0,0,1+j,0,0,0,1+j,0,0,$
$0,0,0,0,0, 0,0,0,0,0,0,0,0,0,0,0,0,0,0,0,0,0,0,0,$
$0,0,0,0,0,0,0,0,0,0,0, 0,0,0,0,0,0,0,0,0,0,0,0,0,0,0,$
$0,0,0,0,0,0,0,0,0,0,0,0,0,0,0,0\}$.

2. The generating method as claimed in claim 1, wherein the second set of time-domain HT-STF sequences is the time-domain HT-STF sequences ($z_n$) for upper 20 MHz of 40 MHz BW configuration and the step of deriving the second set of time-domain HT-STF sequences is based on the relation as $z_n=(-1)^n y_n$; n=0, 1, 2, 3, . . . , 31.

3. The generating method as claimed in claim 1, wherein the second set of time-domain HT-STF sequences is the time-domain HT-STF sequences ($x_n$) for 20 MHz BW configuration and the step of deriving the second set of time-domain HT-STF sequences is based on the relation as $x_n=2(-1)^n y_{2n}$; n=0, 1, 2, 3, . . . , 15.

4. The generating method as claimed in claim 1, wherein the second set of time-domain HT-STF sequences is the time-domain HT-STF sequences ($g_n$) for 40 MHz BW configuration and the step of deriving the second set of time-domain HT-STF sequences is based on the relation as $g_n=[1+j(-1)^n] y_n$; n=0, 1, 2, . . . , 31.

5. A generating method for short training field in IEEE 802.11n communication systems, comprising the steps of:
   storing only a first set of time-domain High-Throughput Short Training Field (HT-STF) sequences in a memory; and
   deriving a second set of the time-domain HT-STF sequences from the first set of the time-domain HT-STF sequences;
   wherein the first set of time-domain HT-STF sequences is a time-domain HT-STF sequences ($y_n$) for lower 20 MHz of 40 MHz bandwidth (BW) configuration, based on the relation as $$y_n = \frac{1}{256}\sum_{k=-128}^{127} Y_k W_{256}^{-nk};$$

where $$W_{256} = e^{-j2\pi/256}; n = 0, 1, 2, \ldots 63$$

wherein j is $\sqrt{-1}$ and $Y_k$ is the first set of frequency-domain HT-STF sequences ($Y_k$) for the lower 20 MHz of 40 MHz BW configuration defined as:

$Y_{-64,63}=$
$\sqrt{1/2}\{0,0,0,0,0,0,0,0,1+j,0,0,0,-1-j,0,0,0,1+j,0,0,0,0,-1-j,0,$
$0,0,-1-j,0,0,0,1+j,0,0,0,0,0,0,0,-1-j,0,0,0,0,-1-j,$
$0,0,0,1+j,0,0,0,1+j,0,0,0,1+j,0,0,0,0,0,0,0,$
$0,0,0,0,0,0,0,0,0,0,0,0,0,0,0,0,0,0,0,0,0,0,0,0,0,$
$0,0,0,0,0,0,0,0,0,0,0,0,0,0,0,0,0,0,0,0,0,0,0,0,0,0,$
$0,0,0,0,0,0,0,0,0,0,0,0,0\}.$ 6. The generating method as claimed in claim 5, wherein the second set of time-domain HT-STF sequences is the time-domain HT-STF sequences ($z_n$) for upper 20 MHz of 40 MHz BW configuration and the step of deriving the second set of time-domain HT-STF sequences is based on the relation as $z_n=(j)^n y_n$; n=0, 1, 2, . . . 63.

7. The generating method as claimed in claim 5, wherein the second set of time-domain HT-STF sequences is the time-domain HT-STF sequences ($x_n$) for 20 MHz BW configuration and the step of deriving the second set of time-domain HT-STF sequences is based on the relation as $x_n=2(j)^n y_{2n}$; n=0, 1, 2, 3, . . . , 31.

8. The generating method as claimed in claim 5, wherein the second set of time-domain HT-STF sequences is the time-domain HT-STF sequences ($g_n$) for 40 MHz BW configuration and the step of deriving the second set of time-domain HT-STF sequences is based on the relation as $g_n=[1+(j)^{n+1}]y_n$; n=0, 1, 2, . . . , 63.

9. A generating method for short training field in IEEE 802.11n communication systems, comprising the steps of:
   storing only a first set of time-domain High-Throughput Short Training Field (HT-STF) sequences in a memory; and
   deriving a second set of the time-domain HT-STF sequences from the first set of the time-domain HT-STF sequences;
   wherein the first set of time-domain HT-STF sequences is a time-domain HT-STF sequences ($z_n$) for upper 20 MHz of 40 MHz BW configuration, based on the relation as $$z_n = \frac{1}{128}\sum_{k=-64}^{63} Z_k W_{128}^{-nk} = \frac{1}{128}\sum_{k=0}^{63} Z_k W_{128}^{-nk}; n = 0, 1, 2, \ldots 31;$$

wherein j is $\sqrt{-1}$ and $Z_k$ is the frequency-domain HT-STF sequences for upper 20 MHz of 40 MHz BW configuration defined as:

$Z_{-64,63}=$
$\sqrt{1/2}\{0,0,0,0,0,0,0,0,1+j,0,0,0,-1-j,0,0,0,1+j,0,0,0,-1-j,$
$0,0,0,-1-j,0,0,0,1+j,0,0,0,0,0,0,0,-1-j,0,0,0,0,-1-$
$j,0,0,0,1+j,0,0,0,1+j,0,0,0,1+j,0,0,0,0,0,$
$0,0,0,0,0,0,0,0,0,0,0,0,0,0,0,0,0,0,0,0,0,0,0,0,0,$
$0,0,0,0,0,0,0,0,0,0,0,0,0,0,0,0,0,0,0,0,0,0,0,0,0,0,$
$0,0,0,0,0,0,0,0,0,0,0,0,0\}.$ 10. The generating method as claimed in claim 9, wherein the second set of time-domain HT-STF sequences is the time-domain HT-STF sequences ($y_n$) for lower 20 MHz of 40 MHz BW configuration and the step of deriving the second set of time-domain HT-STF sequences is based on the relation as $y_n=(-1)^n z_n$; n=0, 1, 2, 3, . . . , 31.

11. The generating method as claimed in claim 9, wherein the second set of time-domain HT-STF sequences is the time-domain HT-STF sequences ($x_n$) for 20 MHz BW configuration and the step of deriving the second set of time-domain HT-STF sequences is based on the relation as $x_n=2(-1)^n z_{2n}$; n=0, 1, 2, 3, . . . , 15.

12. The generating method as claimed in claim 9, wherein the second set of time-domain HT-STF sequences is the time-domain HT-STF sequences ($g_n$) for 40 MHz BW configuration and the step of deriving the second set of time-domain HT-STF sequences is based on the relation as $g_n=[(-1)^n+j]z_n$; n=0, 1, 2, . . . , 31.

13. A generating method for short training field in IEEE 802.11n communication systems, mainly comprising the steps of:
   storing only a first set of time-domain High-Throughput Short Training Field (HT-STF) sequences in a memory; and
   deriving a second set of the time-domain HT-STF sequences from the first set of the time-domain HT-STF sequences;
   wherein the first set of time-domain HT-STF sequences is a time-domain HT-STF sequences ($Z_n$) for upper 20 MHz of 40 MHz BW configuration, based on the relation as $$z_n = \frac{1}{256}\sum_{k=-128}^{127} Z_k W_{256}^{-nk} = \frac{1}{256}\sum_{k=0}^{63} Z_k W_{256}^{-nk}; n = 0, 1, 2, \ldots 63;$$

wherein j is $\sqrt{-1}$ and $Z_k$ is the frequency-domain HT-STF sequences for upper 20 MHz of 40 MHz BW configuration defined as:

$Z_{-64,63}=$
$\sqrt{1/2}\{0,0,0,0,0,0,0,0,1+j,0,0,0,-1-j,0,0,0,1+j,0,0,0,$
$-1-j,0,0,0,-1-j,0,0,0,1+j,0,0,0,0,0,0,0,-1-j,0,0,$
$0,-1-j,0,0,0,1+j,0,0,0,1+j,0,0,0,1+j,0,0,$
$0,0,0,0,0,0,0,0,0,0,0,0,0,0,0,0,0,0,0,0,0,0,0,0,0,$
$0,0,0,0,0,0,0,0,0,0,0,0,0,0,0,0,0,0,0,0,0,0,0,0,0,0,$
$0,0,0,0,0,0,0,0,0,0,0,0,0\}.$ 14. The generating method as claimed in claim 13, wherein the second set of time-domain HT-STF sequences is the time-domain HT-STF sequences ($y_n$) for lower 20 MHz of 40 MHz BW configuration and the step of deriving the second set of time-domain HT-STF sequences is based on the relation as $y_n=(-j)^n z_n$; n=0, 1, 2, ... 63.

15. The generating method as claimed in claim 13, wherein the second set of time-domain HT-STF sequences is the time-domain HT-STF sequences ($x_n$) for 20 MHz BW configuration and the step of deriving the second set of time-domain HT-STF sequences is based on the relation as $x_n=2(-j)^n z_{2n}$; n=0, 1, 2, 3, ..., 31.

16. The generating method as claimed in claim 13, wherein the second set of time-domain HT-STF sequences is the time-domain HT-STF sequences ($g_n$) for 40 MHz BW configuration and the step of deriving the second set of time-domain HT-STF sequences is based on the relation as $g_n=[(-j)^n+j]z_n$; n=0, 1, 2, ..., 63.

* * * * *